UNITED STATES PATENT OFFICE.

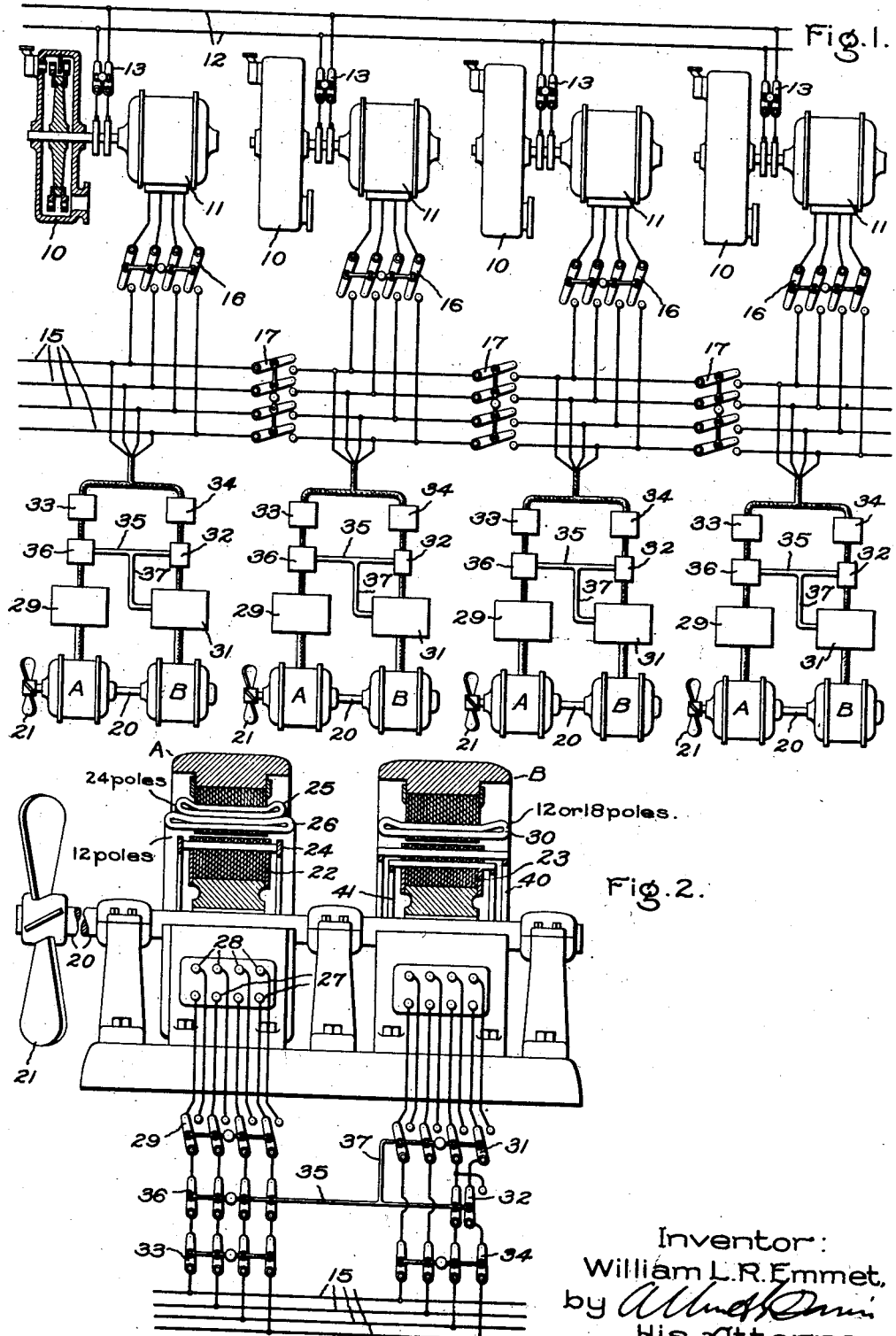

WILLIAM L. R. EMMET, OF SCHENECTADY, NEW YORK, ASSIGNOR TO GENERAL ELECTRIC COMPANY, A CORPORATION OF NEW YORK.

SHIP PROPULSION.

1,304,288.  Specification of Letters Patent.  Patented May 20, 1919.

Application filed March 11, 1916. Serial No. 83,641.

*To all whom it may concern:*

Be it known that I, WILLIAM L. R. EMMET, a citizen of the United States, residing at Schenectady, in the county of Schenectady, State of New York, have invented certain new and useful Improvements in Ship Propulsion, of which the following is a specification.

My invention relates to ship propulsion, and particularly to the propulsion of ships by electric motors. The object of the invention is to provide an improved electric system of ship propulsion, and more specifically to provide an improved arrangement of apparatus for economically driving a large high-speed high-power vessel at a plurality of different speed ranges. Other objects of the invention will be brought out in the course of the following description.

My present invention relates particularly to systems of ship propulsion in which the propellers are driven by induction motors supplied with electric energy from turbo-alternators. The electrical apparatus consisting of the alternators and induction motors acts in effect as a speed reducing gearing between the turbines and the propellers. The alternator-motor speed ratio—that is, the ratio of the alternator and the motor speeds—is determined by the ratio of their respective numbers of poles, and can be altered by changing the number of poles of either with respect to the other. Variations of the ship's speed can be obtained for any particular alternator-motor speed ratio by controlling the admission of elastic fluid to the turbines. In order to secure economic operation over a wide range of speeds, it is customary in practice to change the alternator-motor speed ratio by changing the number of primary magnetic poles of the motors. My present invention aims particularly to provide an improved arrangement of propeller-driving induction motors in which a plurality of alternator-motor speed ratios of considerably different values can be economically and effectively obtained.

The novel features which I believe to be patentably characteristic of my invention are definitely pointed out in the claims appended hereto. The arrangement of the apparatus in and the mode of operation of my present system of ship propulsion will be best understood from the following description taken in conjunction with the accompanying drawings, in which:

Figure 1 diagrammatically illustrates an electric system of ship propulsion embodying my present invention; and Fig. 2 diagrammatically illustrates the arrangement of the propeller-driving induction motors of the system of Fig. 1.

The equipment illustrated in Fig. 1 comprises four elastic fluid turbines 10 directly coupled to polyphase alternators 11. The alternators are of the revolving field type, and the field of each may be energized from direct current mains 12 by means of a switch 13. I have diagrammatically illustrated a quarter-phase stator or armature winding for each of the alternators 11, but it will, of course, be understood that my invention is not limited to quarter-phase apparatus, but on the other hand is adapted to be used with any polyphase apparatus. The armature winding of each of the alternators 11 is adapted to be connected to the quarter-phase bus bars 15 by means of a switch 16. Switches 17 are included in the bus bars 15 for electrically connecting or disconnecting, as desired, particular sections thereof. The equipment represented in Fig. 1 has four propeller shafts 20 carrying propellers 21. Two induction motors A and B have their rotors 22 and 23, respectively, mounted on each propeller shaft 20.

The motor A on each propeller shaft has a secondary winding 24 of the ordinary squirrel cage type and is designed for high efficiency. This motor is, furthermore, provided with two independent primary windings 25 and 26 of considerably different pole numbers. Merely for the purposes of explanation I will assume that the primary winding 26 is designed for 12 poles and for large capacity, while the primary winding 25 is designed for 24 poles with small capacity. The primary winding 26 is brought out to terminals 27, while the primary winding 25 is brought out to terminals 28. A switch 29 serves to connect either of the primary windings to the bus bars 15.

The primary winding of each of the motors B is equipped with a multi-phase winding 30 so designed that it can be connected to produce two different numbers of primary magnetic poles. Again, for the purposes of explanation, I will assume that the primary windings 30 are designed to be connected for either 12 or 18 poles. Any of the well known means for producing primary magnetic poles of different pole numbers may be employed in connection with the primary windings 30, and since there are numerous arrangements for this purpose I do not deem it necessary to explain in detail any specific means, but by way of example I will mention the patent of Ernst F. W. Alexanderson, No. 841,609, dated January 15, 1907, as illustrating one way in which the primary windings 30 may be arranged to produce primary magnetic poles of different pole numbers. For the purpose of explaining my invention, I have illustrated a pole-changing switch 31 connected to the primary winding 30 of each motor B by eight leads, and to the bus bars 15 by four leads. This diagrammatic representation of a primary winding adapted for pole-changing will be well understood by those skilled in the art.

A reversing switch 32 is associated with each of the motors B, and acts to reverse the phase rotation of the primary magnetic field of these motors in the well understood manner. Switches 33 and 34 are further provided between each motor A and B, respectively, and the bus bars 15.

When the pole-changing switch 31 is in the position shown in Fig. 2 of the drawings, that is, its left-hand position, the primary winding 30 is connected for its high speed pole number, that is, for 12 poles, and when the switch 31 is moved to its right-hand position, as viewed in Fig. 2, the primary winding 30 is arranged for its low speed pole number, that is, for 18 poles. The reversing switch 32 is provided with an interlocking mechanism which operates to move the pole-changing switch 31 to its low speed pole position and to disconnect the motor A from the bus bars 15 whenever the reversing switch is thrown to its reversing position. This interlocking mechanism is illustrated in the accompanying drawings in a very elementary manner merely for the purposes of explanation, and as there represented comprises a horizontal bar 35 connecting the reversing switch 32 to a disconnecting switch 36. A vertical bar 37 is secured to the horizontal bar 35, and operates to move the pole-changing switch 31 to its right-hand position when the horizontal bar 35 is moved toward the right by the movement of the reversing switch 32 to its right-hand or reversing position. It will thus be seen that when reversing switch 32 is in its normal position, that is, the position in which it is represented in Fig. 2 of the drawings, the pole-changing switch 31 can be freely moved to either of its operative positions, and the switch 36 is closed. Whenever the reversing switch 32 is moved to its reversing position, the switch 36 is opened and the switch 31 is moved to its low speed pole position, if not already in that position. While the reversing switch is in its reversing position the motor A cannot be connected to the bus bars, nor can the primary winding of the motor B be connected for its high speed pole number.

The secondary winding of each of the motors B is designed so as to provide a secondary circuit of relatively high effective resistance for the conditions of stopping or reversing. The most severe duty which the propelling apparatus of a ship is called upon to perform is the reversal, or even the stopping, of the ship after full speed ahead. For the satisfactory performance of this duty, a large motor torque is necessary, and for this purpose I propose to provide each of the motors B with a secondary winding of inductively changing effective resistance, that is to say, a winding whose effective resistance inductively changes, so that the effective resistance varies as a direct function of the frequency of the secondary current. In the equipment diagrammatically represented in the accompanying drawings, each of the motors B is provided with a double squirrel cage winding comprising two complete squirrel cage windings 40 and 41. The winding 40 has relatively high ohmic resistance and low inductance, while the winding 41 has relatively low ohmic resistance and high inductance. The conductor bars of the winding 40, accordingly, have relatively high ohmic resistance, and are located in slots near the surface of the magnetic core 23, and thus the winding has, as a whole, little inductance. On the other hand, the conductor bars of the winding 41 have low ohmic resistance and are located in slots well beneath the surface of the rotor core 23, and since these conductor bars are substantially embedded in magnetic material, the winding 41, as a whole, has high inductance. On account of its high self-induction, the low resistance winding 41 will carry very little current when the frequency of the secondary current is high, and consequently under this condition the secondary current will be forced into the high resistance winding 40, thus providing an increased torque of the motor when its slip is large. On the other hand, as the frequency of the secondary current diminishes, more and more current flows through the low resistance winding 41, until at normal slip the motor has the desirable running characteristics of an induction motor with an ordinary squirrel cage secondary winding.

For the better understanding of the advantages of my present improved system of propulsion, I will take a concrete case and will assume that the equipment is to be installed on a vessel having a maximum speed of 35 knots and in which three different speed ranges are required, for example, a high speed range from 25 to 35 knots, an intermediate speed range from 18 to 25 knots, and a low speed range below 18 knots. I will assume that the ship requires 100,000 H. P. for her maximum speed of 35 knots. At about 24.8 knots she would then require 26,000 H. P., and at about 18.6 knots she would require 10,000 H. P.

The operation of the equipment will then be substantially as follows: At speeds below about 18 knots, the motors A on all four propeller shafts 20 will receive electric energy from a single alternator 11. The switches 16 and 17 can be manipulated so that any one of the four alternators can be employed for this condition of operation. The primary winding 25 of each of the propeller-driving motors A will be connected to the bus bars 15 by means of the switches 29, 33, and 36. The switches 29 will, accordingly, occupy their right-hand positions, as viewed in Fig. 2. The switches 34 will be open so that no energy is taken by the motors B. The ship is thus driven by the induction motors A of the ordinary squirrel cage type with the 24-pole primary winding excited. At speeds between about 18 and 25 knots the ship will be operated with two generating units, and the propeller shafts will be driven by the motors B. For this speed range the low speed polar arrangement of the primary windings 30 will be used; in other words, the pole-changing switches 31 will occupy their right-hand positions, as viewed in Fig. 2, and the windings 30 will be connected to the bus bars 15 as 18-pole windings. The switches 33 are open, so that the motors A are idle. At speeds above 25 knots the 12-pole connections of both motors will be made and the two motors on each shaft will be operated in parallel, and either three or four generating units will be employed. This is the condition of operation represented by the connections shown in Fig. 2 of the drawings.

In reversing under all conditions and in maneuvering ahead or astern in narrow waters, the double squirrel cage motors B only will be employed, and these motors will be then operated with their low speed pole numbers. This condition is obtained by throwing the reversing switch 32 to its right-hand or reversing position, whereupon the pole-changing switch 31 is thrown to its low speed pole position, if not already in that position.

Where a large amount of power is to be delivered to each propeller shaft with a high propeller speed, it is desirable to use two motors per shaft, because the mechanical proportions of a single motor would be inconvenient, and the weight of such a single motor would be very great, and the rotor with the most advantageous magnetic proportions would be very long as compared with its diameter. In a ship of this class the power required for driving is very high in proportion to the tonnage; consequently, the ship will rapidly lose speed when the power is thrown off. For this reason the problem of stopping and reversing after full speed ahead is relatively less difficult than in vessels of lower power, and, therefore, can be easily handled by the use of only one-half the motor capacity. The double squirrel cage induction motors can be designed to give various degrees of effective resistance and torque in reversing, but higher degrees of reversing torque tend to necessitate the lowering of the normal power factor and to increase the heat concentration in the secondaries during the interval of reversal. The available reversing torque in such a condition is limited by the generator as well as by the motors, and, therefore, with a given secondary resistance, one motor may be nearly or quite as serviceable as two for the purpose of producing reversing torque.

Since the features of design of an effective double squirrel cage reversing motor impair its power factor, it is better to confine this impairment to one motor of the pair, provided that motor can be designed to accomplish the reversal. The second motor per propeller shaft of my present system is of the most efficient type, and can be designed for operation with very high power factor. When the two motors per shaft operate together, the high power factor motor would normally carry the greater load in watts, and the other motor operating at a lower power factor would be designed to carry approximately an equal current. The load on the generator would thus have a power factor resulting from the combination of the two, and this power factor would be higher than it would be if both motors were adequately proportioned for reversing and were used for this purpose.

The low speed polar arrangement of the double squirrel cage motors B is used for reversing instead of the high speed polar arrangement, because the former is capable of affording higher torque with a given generator output, and is at the same time capable of producing a speed amply high for all possible needs for backing or reversing. Thus, by using the low speed connection for reversing, the design of the reversing motors B becomes less extreme, and, accordingly, these motors give better operating results both when used alone and when used in combination with the other motors A. The motors A are provided with two separate windings instead of with a single winding with arrangements for pole-changing, for the reason that the pole-changing desired is of a very large ratio, being 1:2, and such a large ratio of pole-changing cannot be well accomplished without using a winding pitch that would be undesirable for the high speed connection, and which would thus tend to impair the capacity and efficiency of the motor under the conditions where it has to carry heavy loads. The two independent windings on these motors are designed for their different capacities, and by giving to each the most desirable pitch the best results can be obtained under both conditions of operation with a construction of minimum size and weight. Separate primary windings may, of course, be used upon the motors B, instead of using a primary winding adapted to be connected for two different polar arrangements, but in this case nothing would be gained, since the ratio of pole-changing of these motors, 2:3, is adapted for economic operation with both sets of pole connections.

It will be evident from the foregoing description and explanation that I have provided an electric system of ship propulsion in which three different alternator-motor speed ratios can be economically obtained. For the two lower speed ratios only one of the pair of motors on each propeller shaft is used. Since the motors A are designed for the two extreme speed ratios, while the motors B are designed for the two higher speed ratios, the ratio of the change of the pole numbers of the motors B is smaller than the ratio of the change of the pole numbers of the motors A. For each of the three alternator-motor speed ratios, variations in the speed of the ship can be obtained by varying the admission of elastic fluid to the active turbines.

What I claim as new and desire to secure by Letters Patent of the United States, is:

1. A system of electric ship propulsion comprising a propeller and two induction motors adapted to drive said propeller, one of said motors having means for producing primary magnetic fields of two different pole numbers and the second motor having means for producing primary magnetic fields of two different pole numbers of a smaller ratio of change than the ratio of change of the pole numbers of the other motor, the lower pole numbers of said two motors being the same.

2. A system of electric ship propulsion comprising a propeller, and two induction motors adapted to drive said propeller, one of said motors having two independent primary windings adapted to produce primary magnetic fields of different pole numbers, the second motor having means for producing primary magnetic fields of two different pole numbers of a smaller ratio of change than the ratio of change in the pole numbers of the two primary windings of the other motor, the lower pole numbers of said two motors being the same.

3. A system of electric ship propulsion comprising a propeller, two induction motors adapted to drive said propeller, one of said motors having means for producing primary magnetic fields of two different pole numbers and a secondary winding adapted for efficient operation with either number of primary poles, the second motor having means for producing primary magnetic fields of two different pole numbers of a smaller ratio of change than the ratio of change of the pole numbers of the other motor, the lower pole numbers of said two motors being the same, said second motor having a secondary winding adapted to have relatively high effective resistance for secondary currents of relatively high frequency.

4. A system of electric ship propulsion comprising a propeller, two induction motors adapted to drive said propeller, one of said motors having two independent primary windings adapted to produce primary magnetic fields of different pole numbers and a secondary winding adapted for efficient operation with each primary winding, the second motor having a primary winding adapted to be arranged for two different pole numbers of a smaller ratio of change than the ratio of change of the pole numbers of the two primary windings of the other motor, and means associated with said second motor whereby the effective resistance of its secondary circuit is increased when its secondary current is of relatively high frequency.

5. A system of electric ship propulsion comprising a propeller, two induction motors adapted to drive said propeller, one of said motors having two independent primary windings adapted to produce primary magnetic fields of different pole numbers and a squirrel cage secondary winding, the second motor having a primary winding adapted to be arranged for two different pole numbers of a smaller ratio of change than the ratio of change of the pole numbers of the two primary windings of the other motor, and a double squirrel cage winding for said second motor one of which windings has low resistance and high reactance and the other high resistance and low reactance.

6. A system of electric ship propulsion comprising a propeller, two induction motors adapted to drive said propeller, means associated with each motor for producing primary magnetic fields of the same pole numbers for high speed operations of the ship, means associated with one of said motors for producing a primary magnetic field of a relatively high pole number for low speeds of the ship, and means associated with the second motor for producing a primary magnetic field of an intermediate pole number for intermediate speeds of the ship.

7. A system of electric ship propulsion comprising a propeller, two induction motors adapted to drive said propeller, means associated with each of said motors for producing primary magnetic fields of the same pole numbers for high speed operations of the ship, means associated with one of said motors for producing a primary magnetic field of a relatively high pole number for low speeds of the ship, means associated with the second motor for producing a primary magnetic field of an intermediate pole number for intermediate speeds of the ship and for reversing, and means associated with said second motor for increasing its torque during the interval of reversal.

8. A system of electric ship propulsion comprising a propeller, two induction motors adapted to drive said propeller, means associated with each of said motors for producing primary magnetic fields of the same pole numbers for high speed operations of the ship, means associated with one of said motors for producing a primary magnetic field of a relatively high pole number for low speeds of the ship, means associated with the second motor for producing a primary magnetic field of an intermediate pole number for intermediate speeds of the ship and for reversing, the first of said motors having a short-circuited secondary winding adapted for efficient operation with either pole number of the primary magnetic field and the second of said motors having a secondary winding adapted to have relatively high effective resistance for secondary currents of relatively high frequency.

9. A system of electric ship propulsion comprising a propeller, two induction motors adapted to drive said propeller, two independent primary windings of different pole numbers for one of said motors, and a primary winding for the second motor adapted to be arranged for two different pole numbers of a smaller ratio of change than the ratio of change of the pole numbers of the two primary windings of the other motor, the lower pole numbers of the primary windings of said two motors being the same.

10. A system of electric ship propulsion comprising a propeller, two induction motors adapted to drive said propeller, two independent primary windings of different pole numbers for one of said motors, a primary winding for the second motor adapted to be arranged for two different pole numbers of a smaller ratio of change than the ratio of change of the pole numbers of the two primary windings of the other motor, the lower pole numbers of the primary windings of said two motors being the same, and means for connecting the primary windings of said two motors to produce their common pole numbers for high speed operations of the ship and for connecting the other independent primary winding of the first motor for relatively low speeds of the ship and for arranging the primary winding of the second motor for its higher number of poles for intermediate speeds of the ship.

11. A system of electric ship propulsion comprising a propeller, two induction motors adapted to drive said propeller, two independent primary windings of different pole numbers for one of said motors, a short-circuited secondary winding for the last mentioned motor, a primary winding for the second motor adapted to be arranged for two different pole numbers of a smaller ratio of change than the ratio of change of the pole numbers of the two primary windings of the other motor, the lower pole numbers of the primary windings of said two motors being the same, means for connecting the primary windings of said two motors to produce their common pole numbers for high speed operations of the ship and for connecting the other independent primary winding of the first motor for relatively low speeds of the ship and for arranging the primary winding of the second motor for its higher number of poles for intermediate speeds of the ship and for reversing, and means associated with said second motor for increasing its torque during the interval of reversal.

In witness whereof, I have hereunto set my hand this 10th day of March, 1916.

WILLIAM L. R. EMMET.